E. J. MONTAGUE.
MANIFOLD FOR INTERNAL COMBUSTION ENGINES.
APPLICATION FILED OCT. 5, 1917.

1,316,629.

Patented Sept. 23, 1919.
3 SHEETS—SHEET 1.

WITNESSES
W. C. Fielding
Wm. Zeaman

INVENTOR
Edgar J. Montague
BY
Richard B. Owen
ATTORNEY

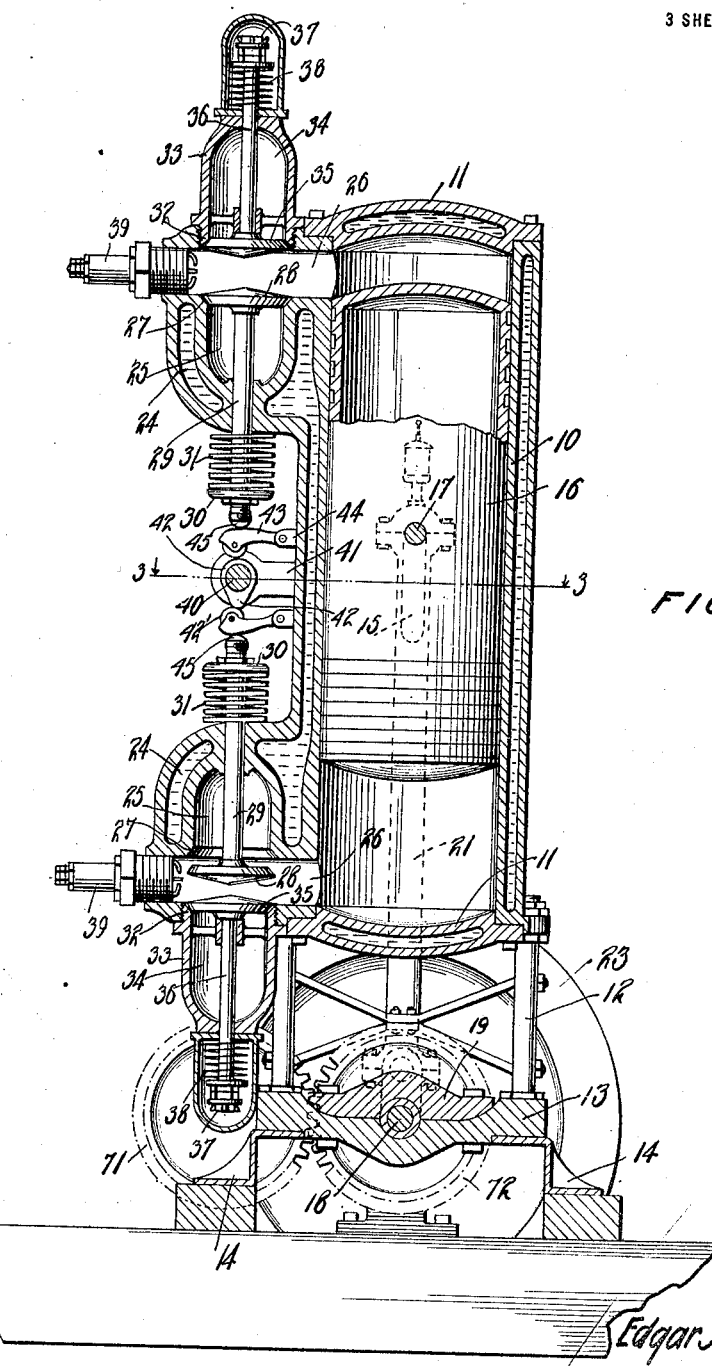

E. J. MONTAGUE.
MANIFOLD FOR INTERNAL COMBUSTION ENGINES.
APPLICATION FILED OCT. 5, 1917.
1,316,629.
Patented Sept. 23, 1919.
3 SHEETS—SHEET 3.
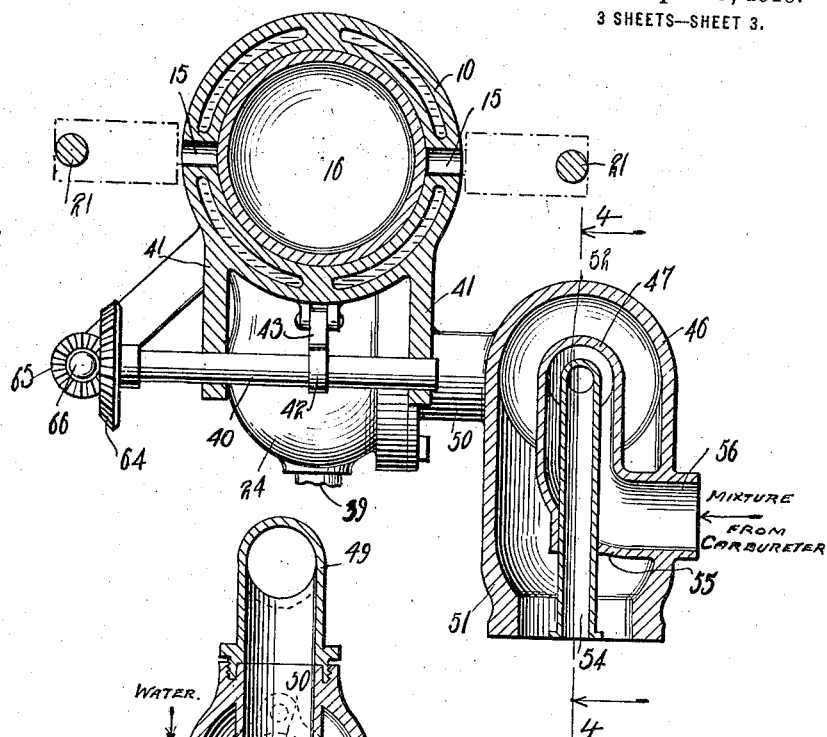
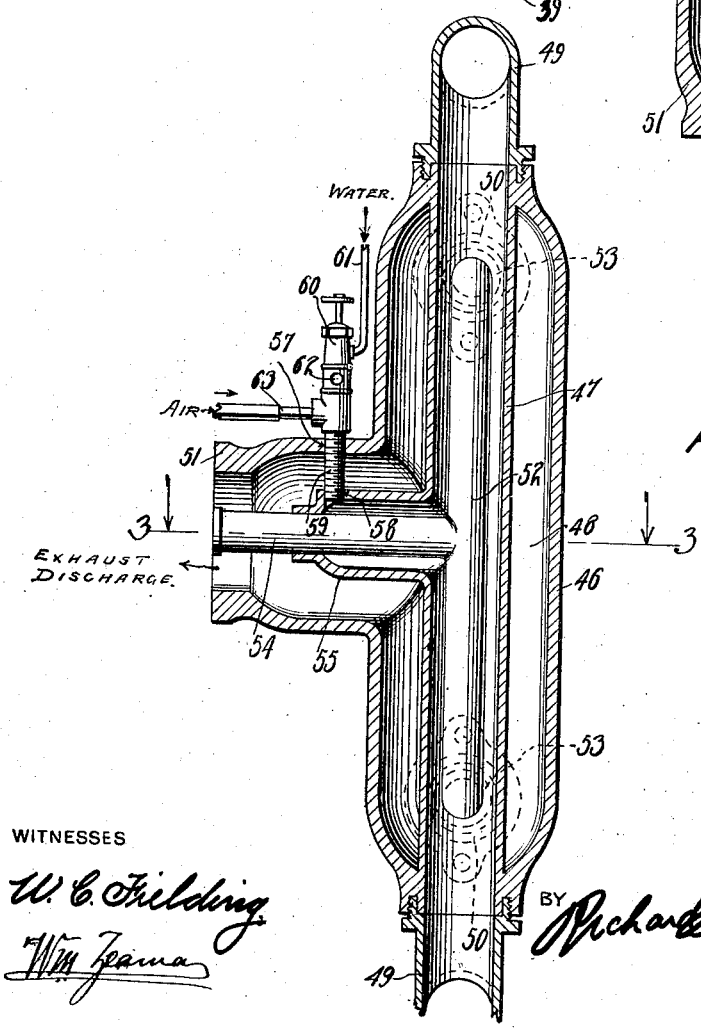
WITNESSES
INVENTOR
Edgar J. Montague
BY
ATTORNEY

UNITED STATES PATENT OFFICE.

EDGAR J. MONTAGUE, OF CORTLAND, NEW YORK.

MANIFOLD FOR INTERNAL-COMBUSTION ENGINES.

1,316,629.   Specification of Letters Patent.   Patented Sept. 23, 1919.

Application filed October 5, 1917.   Serial No. 194,956.

*To all whom it may concern:*

Be it known that I, EDGAR J. MONTAGUE, a citizen of the United States, residing at Cortland, in the county of Cortland and State of New York, have invented certain new and useful Improvements in Manifolds for Internal-Combustion Engines, of which the following is a specification.

This invention has relation to internal combustion engines, and has for an object to provide improvements therein which include the provision of an explosion chamber at each end of the cylinder to alternately drive the piston in both directions, thereby providing in effect a double acting engine with the resultant advantages to be obtained by way of an increase in power, a more perfectly balanced operation, and other advantages which will become apparent to those skilled in this art as the description of my invention proceeds.

Another object of the invention is to provide an internal combustion engine having the above named characteristics, and including a cylinder formed with an explosion chamber at each end, a piston designed to receive a power stroke at either end, exhaust and intake valves controlling communication to each explosion chamber, and a single cam shaft to alternately operate the exhaust valve whereby the various phases in the operation of a four-cycle engine may take place, and where an explosion stroke occurs upon each revolution of the crank shaft.

A still further object of the invention is to provide a new and improved combined intake and exhaust manifold for internal combustion engines designed to utilize the heat of the exhaust gases to preliminarily raise the temperature of the vaporized fuel passing through the intake manifold to secure a greater degree of expansion of the exploding charge with a consequent increase in power, and to insure a complete vaporization of the fuel.

A still further object of the invention is to provide means for introducing water into the intake manifold of an internal combustion engine in the form of a fine spray, to obtain greater flexibility in the operation of the engine, and to prevent the deposition of carbon on the walls of the cylinder.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:

Fig. 2, is a view in vertical section taken on the line 2—2 of the preceding figure.

Fig. 3, is a horizontal section taken on the line 3—3 of Fig. 2, and

Fig. 4, is a detail section taken on the line 4—4 of Fig. 1.

Figure 1:
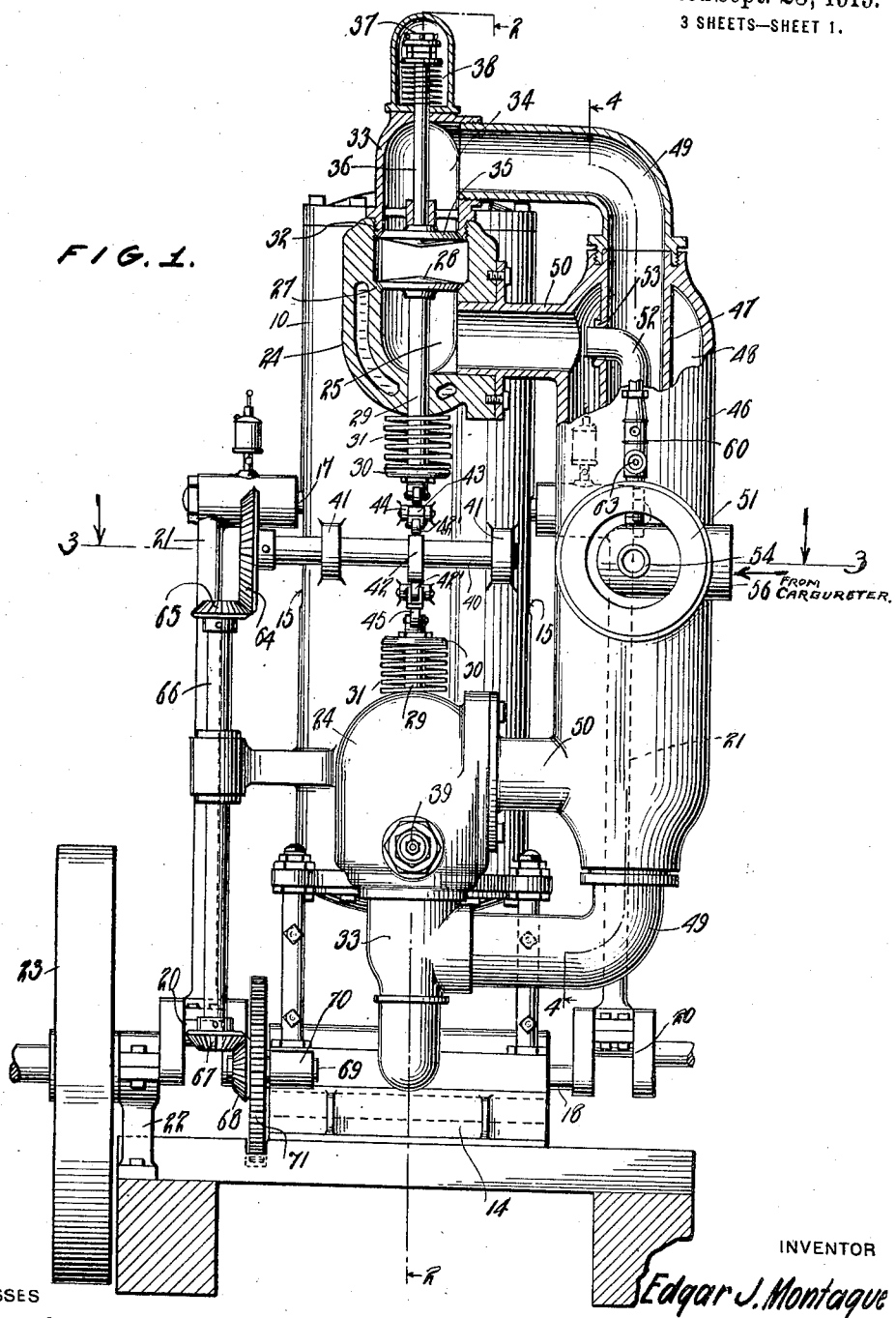
Figure 1, is a view in front elevation of an internal combustion engine embodying my improvement.

With reference to the drawings, 10 indicates a cylinder which may be disposed in a vertical position, open at each end, and said ends closed by removable cylinder heads or plates 11, the walls of the cylinder as well as the wall of the cylinder heads are cored out to form a water jacket after the usual manner. The cylinder is supported upon four posts indicated at 12 which in turn are supported upon a base plate 13 in turn being mounted upon horizontal beams 14 which may have any foundation desired or rendered necessary in the installation of the engine. The wall of the cylinder is provided at opposite sides with longitudinally extending slots 15, and a piston 16, mounted for sliding movement within the cylinder is provided with a transversely extending wrist pin 17 which extends through the piston, and through the slot 15 to extend at its end beyond the outer surface of the cylinder. The base plate 13 is formed with a semi-circular cavity to receive the crank shaft 18, and a bearing cap 19, formed with a semi-circular cavity is applied to the upper surface of the base plate to secure the crank shaft in place and to form a journal therefor. The crank shaft is provided upon opposite ends with offsets 20, extending in the same direction for connection to the lower end of connecting rods 21, a pair of which are provided, one being located at each side of the cylinder, with the upper ends of said connecting rods connected to the projecting ends of the wrist pin 17. Additional bearings 22 may be provided for the crank shaft, and a fly wheel 23 may be mounted thereon. The crank shaft may be of any length desired and provided with as many offsets as may be necessary in order to accommodate more cylinders to provide a multi-cylinder engine.

The cylinder 10 is provided at its end with an integrally formed exhaust valve casing 24 formed if desired, with a passage in its walls to communicate with the water jacket of the cylinder whereby the valve casing may be cooled during operation of the engine. Each valve casing is formed with a lateral exhaust opening 25 which is in communication at times with a laterally extending passage 26 in communication with the interior of the cylinder, a passage 26 being provided at each end of the cylinder. A valve seat 27 is formed in each valve casing and a valve 28 is provided in each casing to be seated on said valve seat and to move in a direction parallel to the longitudinal axis of the cylinder. Each valve 28 is provided with a valve stem 29, said valve stems extending toward each other and their adjacent terminals terminating at a point adjacent the transverse center of the cylinder. A washer 30 is applied to the adjacent terminals of the valve stem and a coil spring 31 is embraced about the valve and interposed between the washer 30 thereof and the exhaust valve casing whereby to retain the exhaust valve in normally closed position. It will be observed that when the exhaust valves are closed communication is disestablished between the interior of the cylinder and the exhaust port 25 of the valve casing.

Each valve casing is furthermore formed with a threaded opening indicated at 32 communicating with the passage 26 whereby to receive the correspondingly threaded ends of an intake valve casing 33 of which there are two provided. Each intake valve casing 33 is formed with an intake opening 34 which may communicate at times with the passage 26, and a valve seat formed in each of said valve casings to receive a valve 35 of which there is one provided in each intake valve casing. Each valve 35 is provided with a valve stem 36, the stems 36 extending in opposite directions and in a direction parallel to the longitudinal axis of the cylinder. A washer 37 is secured to the outer or remote end of the valve stem 36, and a coil spring 38 is embraced about each valve stem 36 and interposed between the washer 37 and the exterior surface of the valve to retain the intake valve 35 in normally closed position. Each exhaust valve casing 24 is furthermore provided with an opening to receive a spark plug 39 whereby the terminals of the spark plug may extend into the passage 26 to ignite the charge contained therein, the combustion being transmitted to the charge within the cylinder 10.

A cam shaft 40 is disposed horizontally between the adjacent terminals of the exhaust valve stem 29, and is journaled upon bearings 41 extending laterally from the cylinder wall, and is provided at a point intermediate its ends with a cam 42. The cam, during rotation of the cam shaft alternately engages rollers 42' which are mounted on the outer ends of arms 43, the arms in turn being pivotally mounted upon their inner ends upon ears 44 for vertical oscillation, the outer ends of the arms engaging rollers 45 mounted upon the adjacent ends of said exhaust valve 10. It will be observed that during each complete rotative movement of the cam shaft each exhaust valve will be unseated.

The exhaust opening 27 and the intake openings 34 are located upon the same side of the valve casing for connection to a manifold of an improved design. This manifold consists of a cylindrical member 46 through which a tubular member 47 extends longitudinally and in spaced relation thereto to form an annular channel 48. The cylindrical casing 46 is closed at opposite ends, but the ends of the tubular member 47 extend beyond the ends of the member 46 and are placed in communication, by means of elbow couplings 49 with the intake openings 34 of the intake valve casing. The outer casing 46 is provided at each end with a laterally extending branch 50 which is placed in communication with the exhaust openings 25 of the exhaust valve casing. Said casing 46 is furthermore provided with a laterally extending branch 51 at a point intermediate its ends to connect to a conduit whereby the exhaust gases may be led away from the engine to a point of emission. A tubular member 52 is furthermore provided within the tubular member 47 to extend longitudinally thereof and in spaced relation thereto, with the ends of said member 52 bent at right angles to extend through openings 53 in the wall of the member 47 whereby to communicate with the interior of the casing 46. The tubular member 52 is furthermore provided at a point intermediate its ends with a branch 54 which communicates with the interior of the branch 51 of the outer casing 46. Both ends of the member 52, as well as the end of the branch 54, are open so that exhaust gas may pass freely through the said member and branch. The tubular member 47 is also provided at a point intermediate its ends with a branch 55 which extends through openings 56 in the wall of the branch 51 of the outer casing for connection to a carbureter or any source of power supply. It will thus be observed that the casing 46 constitutes in effect an exhaust manifold, while the tubular member 47 contained therein consists in effect of an intake manifold which is inclosed within the exhaust manifold but not in communication therewith at any point. An auxiliary exhaust passage is extended through the intake manifold without communicating therewith by the provision of the tubular member 52.

The branches 51 and 55 of the exhaust and intake manifolds respectively are each provided with an opening 57 and 58 respectively which are in alinement to receive the threaded extension 59 of an atomizer indicated generally at 60. This atomizer is provided with a water inlet 61 whereby water may be fed, a drop at a time, the flow of water being observed through an opening 62 provided in the wall of the atomizer. A lateral opening is provided in the atomizer through which an air supply pipe 63 extends whereby the water may be injected with force into the intake manifold and in a fine spray.

The cam shaft 40 is provided with a miter gear 64 which meshes with a miter gear 65 mounted upon the upper end of the timing shaft 66 which extends vertically and is provided upon its lower end with a miter gear 67 for meshing engagement with a miter gear 68 mounted upon a stub shaft 69 which is journaled in a bearing 90 upon the base plate of the engine. The stub shaft 69 is provided with a spur gear 71 which is in meshing engagement with a spur gear 72 mounted upon the time shaft. The ratio of the gears 64 and 65 is such as to cause the cam shaft 40 to rotate one complete revolution to every two complete revolutions of the crank shaft. From the foregoing description it will be apparent that I have provided an internal combustion engine which is formed with an explosive chamber at each end. Considering the operation of the engine with reference to one end of the cylinder at a time, the various phases of operation such as the intake, compression, explosion and exhaust take place in the usual manner, the intake valve 35 opening automatically by the suction within the cylinder during the intake stroke of the piston, and the exhaust valve opening under the influence of the cam shaft 40, at the time when the piston is moving on an exhaust stroke. However, it will be observed that since only one cam 42 is provided upon the cam shaft, the exhaust valves are open alternately, and an explosion takes place during each complete revolution of the crank shaft. The reciprocatory movement of the piston is transmitted through the wrist pin 17 and connecting rods 21 to the crank rotating the same. By providing a double acting engine of the character above described it will be apparent that the output in terms of horsepower will be doubled, and the efficiency of the engine will be improved as a whole by the balanced operation obtained.

During the intake stroke of the piston, in either direction, the charge is drawn through the branch 55 of the intake manifold 47 and into one valve casing 33 or the other as the case may be. During the passage of the charge through the intake manifold it is heated by contact with the sides of the pipe 52 inclosed therewithin as well as by contact with the walls of the intake manifold which are heated by the circulation of the exhaust gases through the chamber 48 of the exhaust manifold in effecting an exit. The intake gases are thus subjected to a preliminary heating process which causes the temperature of the gas to rise to such an extent as to insure positive combustion thereof and at the same time to insure an increased expansion of the fuel vapor when exploded.

It will furthermore be apparent, that by the introduction of water in a fine spray into the intake manifold the flexibility of operation of the engine will be increased by the formation of steam within the combustion chambers of the engine, and furthermore the deposition of carbon on the walls of the cylinder will be prevented. Other advantages will be apparent to those skilled in the art to which this invention appertains and will readily make themselves apparent when an engine is constructed in accordance with my invention and the manner of operation observed.

While I have illustrated and described my invention with some degree of particularity, I realize that in practice various alterations thereover may be made, and I therefore desire to reserve the right and privilege of changing the form of the details of construction or otherwise altering the arrangement of the correlative parts without departing from the spirit of the invention or the scope of the appended claims.

Having thus described my invention what I claim as new and desire to secure by Letters Patent is:—

1. A manifold for internal combustion engines including an outer casing, forming an exhaust manifold, a tubular member constituting an intake manifold disposed within the outer casing and throughout the length of the latter in spaced relation thereto, and a tubular member centrally arranged in said intake manifold and throughout the length thereof and having its ends in communication with the interior of the exhaust manifold.

2. A manifold for internal combustion engines including an outer casing, a lateral branch at each end thereof, an intake manifold extending through the exhaust manifold in spaced relation thereto, and throughout the length of the latter, and a tubular member extending through the intake manifold and having its ends in communication with the branches of the exhaust manifold.

3. A manifold for internal combustion engines including, an outer casing, a branch leading therefrom at a point intermediate its ends, a lateral branch at each end of said casing, an intake manifold extending longitudinally through the outer casing in spaced relation thereto, a branch in the intake manifold at a point intermediate its ends leading into the intermediate branch of the outer casing, a tubular member within the said manifold, having its ends extending through the wall of the intake manifold and in communication with the end branches of the outer casing, and a branch at a point on said inner tube intermediate its ends extending through the intermediate branch of the outer casing in communication therewith.

In testimony whereof I affix my signature in presence of two witnesses.

EDGAR J. MONTAGUE.

Witnesses:
M. C. JONES,
WM. ZEAMAN.

Copies of this patent may be obtained for five cents each, by addressing the "Commissioner of Patents, Washington, D. C."